United States Patent [19]

Cottrell

[11] 4,062,438

[45] Dec. 13, 1977

[54] STICK SEPARATING APPARATUS

[75] Inventor: Edward D. Cottrell, Cattaraugus, N.Y.

[73] Assignee: Champion International Corporation, Stamford, Conn.

[21] Appl. No.: 713,882

[22] Filed: Aug. 12, 1976

[51] Int. Cl.[2] .............................................. B65G 47/26

[52] U.S. Cl. .................................... 198/425; 198/492; 214/1 P

[58] Field of Search ............... 198/425, 418, 461, 469, 198/470, 460, 503, 530-532, 492, 577, 832, 855, 857, 859, 491; 214/1 C, 1 P, 1 PB

[56] References Cited

U.S. PATENT DOCUMENTS

| | | | |
|---|---|---|---|
| 2,751,059 | 6/1956 | Klein et al. | 198/425 |
| 3,568,823 | 3/1971 | Ypsilanti et al. | 198/492 |
| 3,870,139 | 3/1975 | Wagner | 198/462 |
| 3,931,879 | 1/1976 | Javerzat et al. | 198/418 |
| 3,951,304 | 4/1976 | Heinz et al. | 198/503 |

*Primary Examiner*—John J. Love
*Assistant Examiner*—Joseph E. Valenza
*Attorney, Agent, or Firm*—Evelyn M. Sommer

[57] ABSTRACT

Apparatus for counting a plurality of pointed sticks and segregating the sticks into groups containing a predetermined count. The sticks are fed onto an endless conveyor belt from a pointing station and are counted as they are dropped onto the conveyor. After a predetermined number of the sticks are counted, a gate above the conveyor belt adjacent the input end thereof is actuated in response to an electronic signal received from the counter to prevent further sticks from being fed onto the belt. Simultaneously, the speed of the conveyor is increased to space the sticks on the belt from those accumulated behind the gate. The sticks on the belt are then trapped between the output end of the conveyor and a trap gate and are manually removed from the conveyor. The first gate is then retracted to spill another group of sticks onto the conveyor behind the trap gate and the operation is recycled.

3 Claims, 6 Drawing Figures

A
B
F
10
12
14
16
18
20
22
26
28
30
32
34
36
38
40
41
44
46
48
54
56
58
60
62
64
66
68
70
72
74
76
78
80
84
86

STICK SEPARATING APPARATUS

BACKKGROUND OF THE INVENTION

1. Field of the Invention

This invention generally relates to an apparatus for separating articles into groups containing a predetermined number of the articles, and more particularly, to an apparatus for separating pointed sticks into such groups to facilitate their unloading from a conveyor and subsequent packaging.

2. Description of the Prior Art

In my copending application, Ser. No. 703,971 filed July 9, 1976, and entitled "Stick Pointing Apparatus", an apparatus is disclosed for grinding conical points on one end of a plurality of paper sticks. The sticks are used as a holder inserted into a variety of diverse products, such as confections, feminine hygiene tampons, and the like. The ends of the sticks are ground by an abrasive belt positioned at an angle to a chain link conveyor which moves each stick sequentially past the abrasive belt. As the end of each stick is ground, it is rotated on the chain link conveyor.

At the conclusion of the grinding operation, the pointed sticks are fed to a runout conveyor. An operator manually removes and loads a predetermined number of the sticks into a shipping carton. This invention provides an apparatus for segregating the sticks on the conveyor into groups containing a predetermined number of the sticks, e.g., 500, so that an operator may grasp a segregated group of the sticks, remove them from the conveyor, and load them directly into a shipping carton without bothering to count the sticks.

SUMMARY OF THE INVENTION

In accordance with the invention, the sticks are counted by a photocell arrangement as they are fed from the chain link conveyor at the pointing station to the runout conveyor. After a suitable time delay after the predetermined count is recorded, the photocell arrangement supplies an electrical signal to actuate an air-operated gate between the end of the chain link conveyor and an input end of the runout conveyor to prevent any further sticks from accumulating on the runout conveyor. Simultaneously, the speed of the runout conveyor is increased some fifteen fold to space the sticks on the runout conveyor from the sticks continuing to accumulate behind the gate. An air-operated trap is actuated to confine the segregated and spaced sticks on the conveyor between the trap and the output end of the conveyor wherein the sticks can be manually grasped by an operator, removed from the conveyor, and loaded directly into a shipping carton. The gate is then retracted to spill the next batch of pointed sticks onto the runout conveyor up to the trap. The trap is then retracted and the speed of the runout conveyor returned to normal. The cycle repeats after another group of a predetermined number of the sticks are counted by the photocell arrangement.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
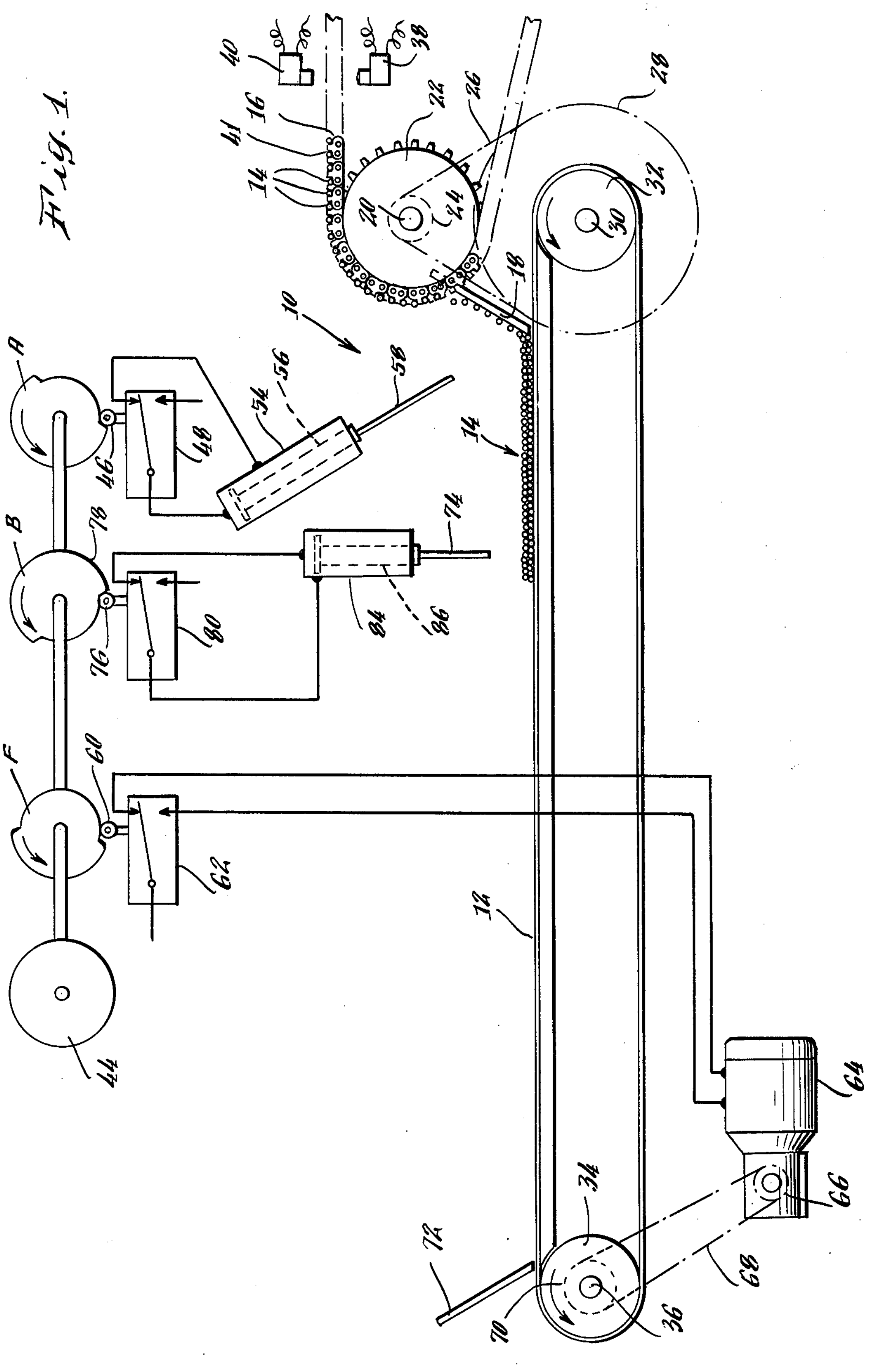
FIGS. 1 through 5 are schematic side elevational views of the stick separating apparatus of the present invention, illustrating the sequential operation thereof.

Referring now to the drawings in detail, wherein like numerals indicate like elements throughout the several views, the stick separating apparatus 10 of the present invention includes an endless belt runout conveyor 12 for collecting a plurality of sticks 14 having an end ground to a conical tapered point on a chain link conveyor 16.

Runout conveyor 10 is supported beneath one end of chain link conveyor 16 to receive the sticks 14 which roll down an inclined ramp 18 traversing the distance between conveyors 12 and 16. Conveyor 16 is driven by a shaft 20 which rotatably drives a sprocket 22 in mesh between the links of conveyor 16. Shaft 20 also mounts a small pulley 24 connected via a drive belt 26 to a large pulley 28 mounted on a shaft 30. Rotation of shaft 30 causes rotation of a roll 32 fixed to shaft 30 which is frictionally engaged with the endless belt of runout conveyor 12 to drive the conveyor 12 in a counterclockwise direction as viewed in FIGS. 1 through 5. The opposite end of conveyor 12 is entrained about an idler roll 34 fixed to a shaft 36.

Chain link conveyor 16 normally travels at approximately 41.6 FPM which is the equivalent of feeding 1000 sticks per minute to runout conveyor 12. Through the ratio of pulleys 24 and 28, the speed of runout conveyor 12 is reduced to a normal operating speed of 10 FPM, thereby permitting sticks 14 to pile up on the input end of conveyor 12.

Sticks 14 are counted by a photocell 38 every time a light beam emitted continuously by a source 40 is interrupted. Light source 40 is mounted above the end of chain link conveyor 16, which includes spaced pockets 41 carrying individual ones of the sticks 14, while photocell 38 is mounted below conveyor 16 in the path of the beam emitted by source 40. Everytime the beam is interrupted, a pulse is transmitted to a conventional recycling, fixed count counter 42 which stores a predetermined number of pulses, e.g., 500, and after a suitable time delay, emits an electrical signal to drive a cam drive motor 44 through a single revolution. The time delay is preset to approximate the time it takes for the last 500th stick counted on conveyor 16 to reach conveyor 12. When the last stick 14 is counted, counter 42 recycles and begins a new count. A typical counter 42 suitable for the purpose indicated is manufactured by Automatic Timing and Controls Co. of King of Prussia, Pennsylvania under the designation 334B Count Controller.

Figure 6:
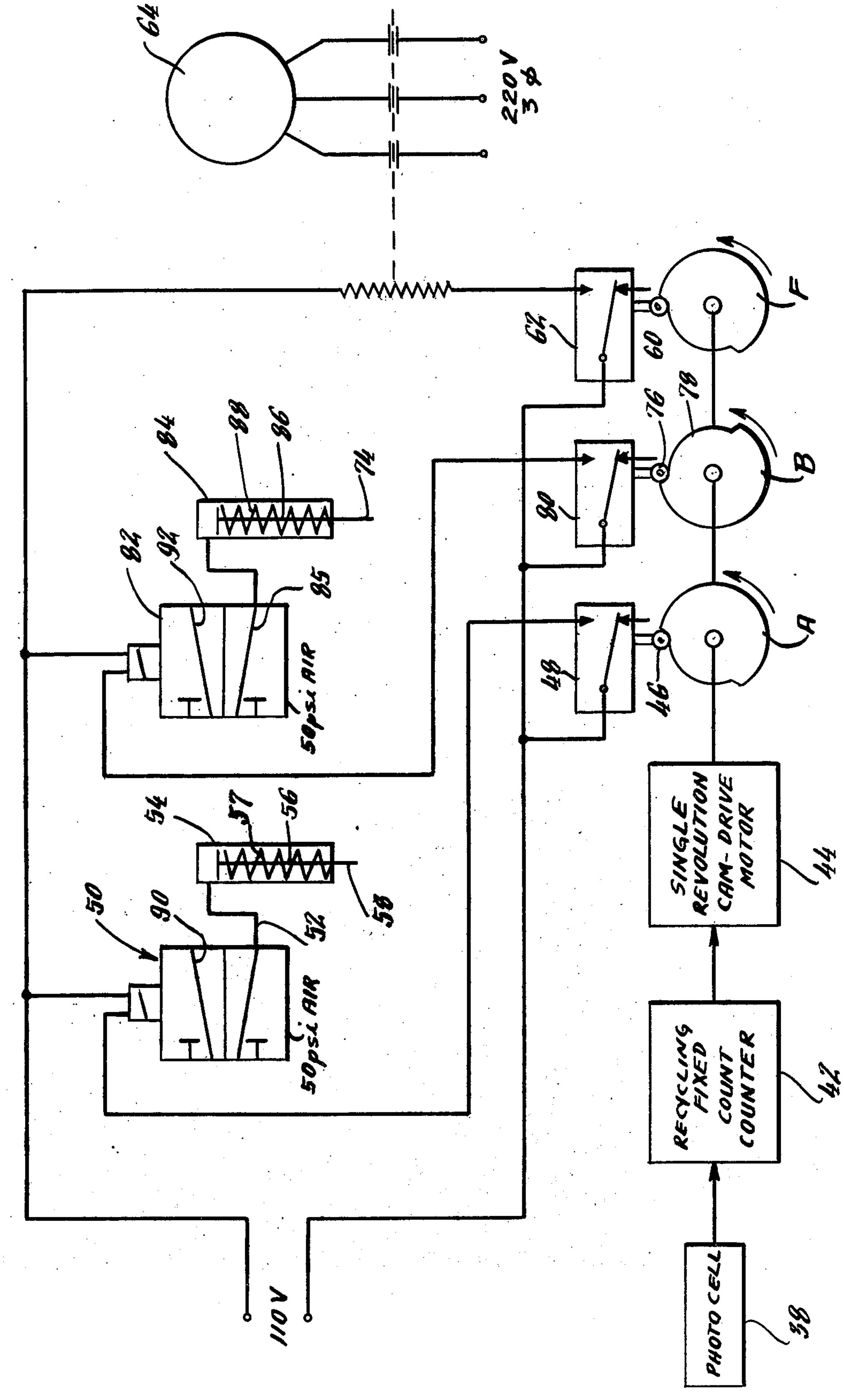
FIG. 6 is an electrical schematic diagram of a timing circuit used with the apparatus illustrated in FIGS. 1 through 5, inclusive.

As shown in FIG. 6, actuation of motor 44 causes rotation of a cam A in a couterclockwise direction causing a cam follower 46 to be elevated on the periphery of cam A. Cam follower 46 closes a normally open switch 48 to activate a two-way solenoid valve 50 to supply air under pressure to a cylinder 54 through a line 52.

Figure 2:
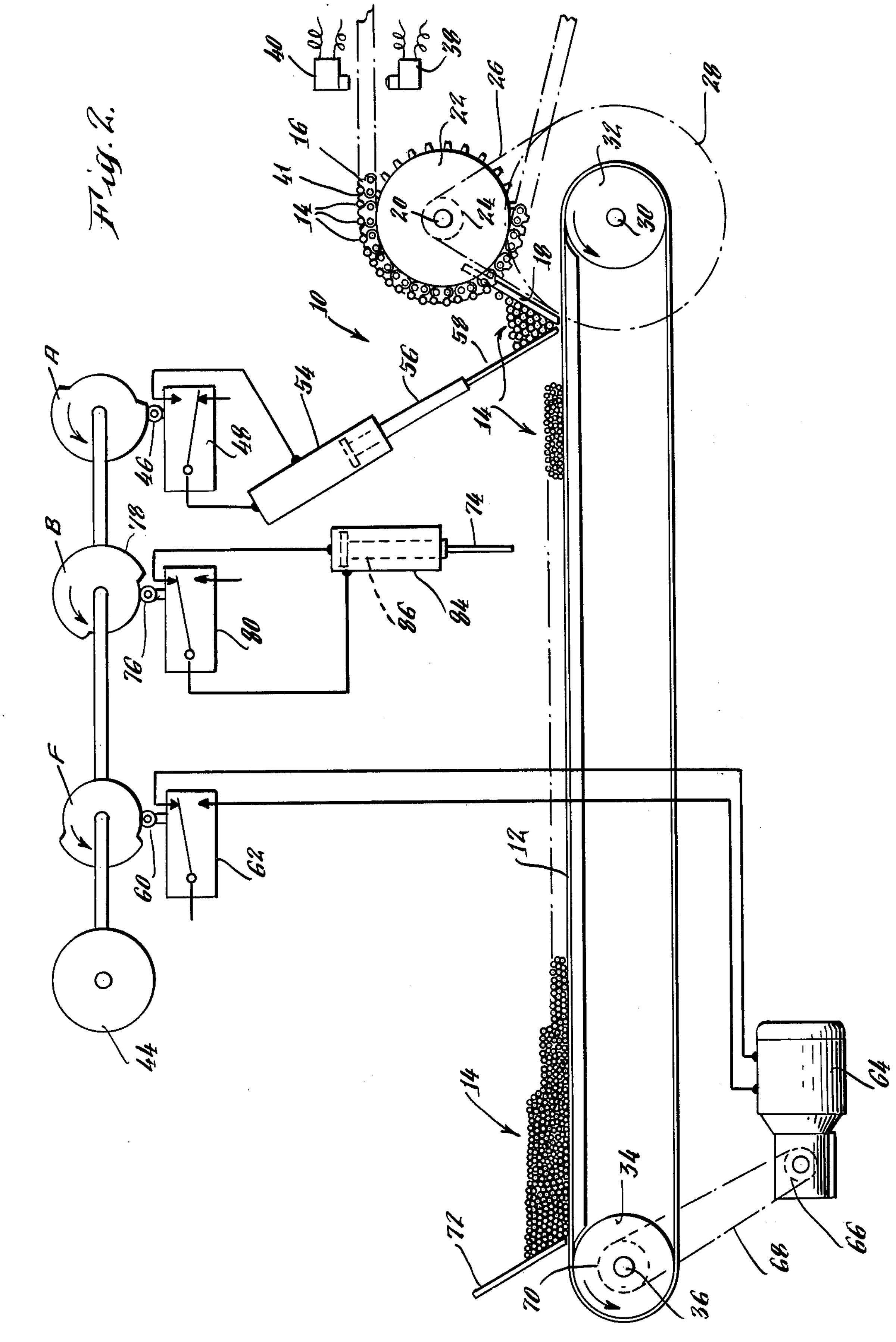

Cylinder 54 has a piston 56 which is normally urged by a spring 57 to a position retracting piston 56 within cylinder 54. Piston 56 is connected to a gate 58. As shown in FIG. 2 when solenoid 50 is actuated to admit air to cylinder 54, piston 56 and gate 58 will be extended to a position adjacent runout conveyor 12 segregating a predetermined number of sticks, e.g., 500, on runout conveyor 12.

Figure 3:
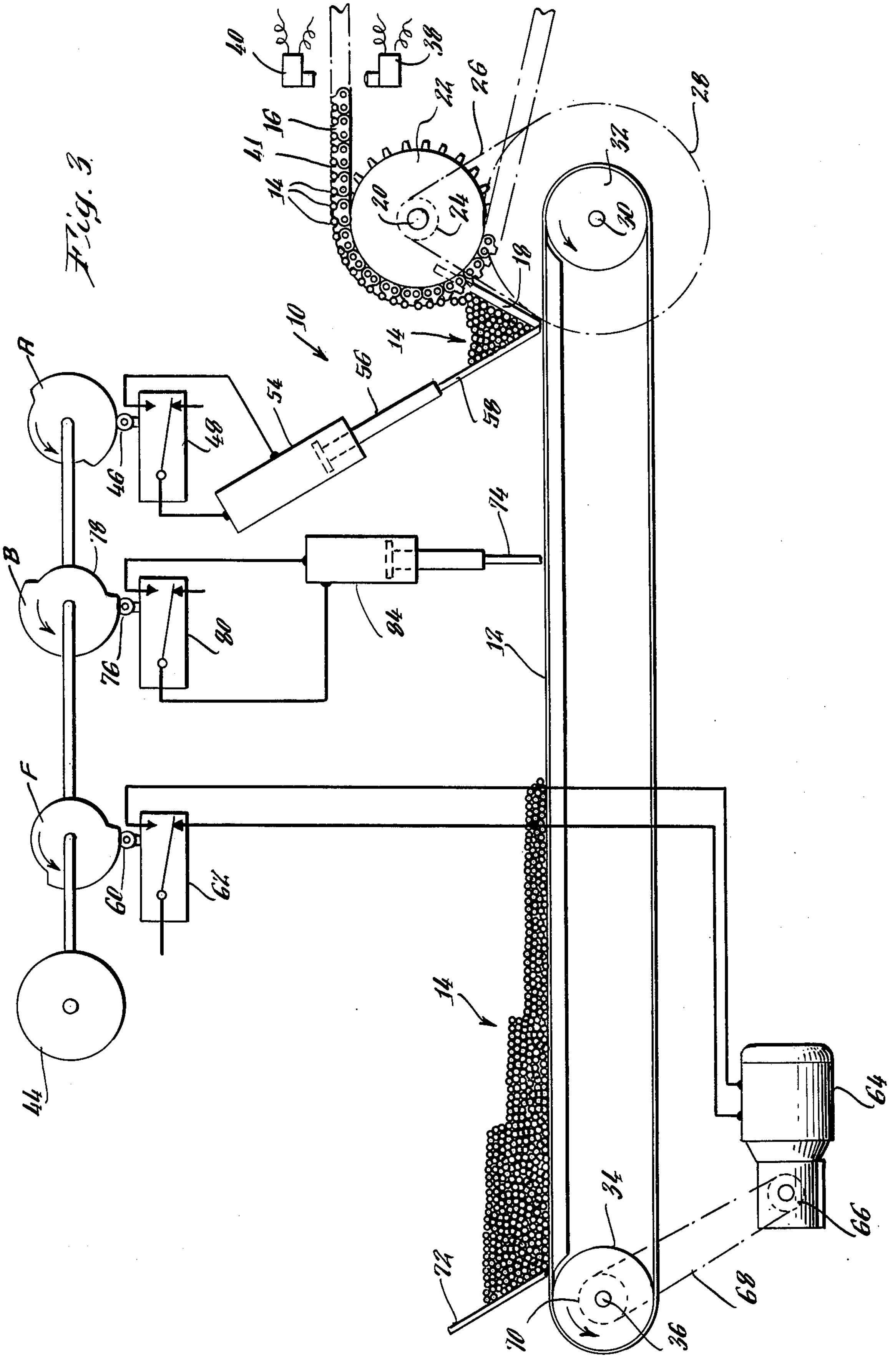

At the same time, the speed of runout conveyor 12 is increased some 15 fold to approximately 150 FPM to space the sticks on conveyor 12 from the sticks 14 which continue to accumulate behind gate 58 under the new count. This is accomplished by a second cam F which is simultaneously driven by the single revolution cam motor 44. As shown in FIG. 6, actuation of motor 44 causes rotation of cam F in an counter-clockwise direction causing a cam follower 60 to be elevated on the periphery of cam F. Cam follower 60 closes a normally open switch 62 to activate a gearhead motor 64. Motor 64 has a pulley 66 mounted on its output shaft connected by an endless belt 68 to a pulley 70 mounted on shaft 36. An overrunning clutch bearing (not shown) is installed in the hubs of rolls 34 and 32 which permits the rolls 34 and 32 to overrun in the direction of travel of the endless belt runout conveyor 12. Accordingly, upon activation of motor 64, runout conveyor 12 can be driven by the motor 64 through belt 68 at a greater speed than furnished by belt 26 drivingly connected to drive shaft 30. Upon activation of motor 64, runout conveyor 12 will be driven by motor 64 at approximately 150 FPM to increase the speed of runout conveyor 12 to space and accumulate the segregated sticks 14 in a pile against a stop 72 mounted at the output end of conveyor 12, substantially as shown in FIG. 3.

After a suitable time interval, an air-operated trap 74 is actuated to confine the segregated sticks 14 on runout conveyor between the trap 74 and the output end of the conveyor 12 wherein the predetermined number of sticks 14 can be manually grasped by an operator, removed from the conveyor 12, and loaded directly into a shipping carton. As shown more clearly in FIG. 6, while cam followers 46 and 60 are on the high side of cams A and F, respectively, the cam follower 76 is on the lower or dwell portion 78 of a third cam B driven by single revolution cam drive motor 44. After a suitable time interval of operation of cams A and F as measured by the dwell portion 78 of cam B, cam follower 76 is raised onto the elevated periphery of cam B. Cam follower 76 closes a normally open switch 80 to activate a two-way solenoid valve 82 to supply air under pressure to a cylinder 84 through a line 85.

Reciprocably mounted within cylinder 84 is a piston 86 connected to trap 74, which constitutes a second gate. Piston 86 is normally urged by a coil spring 88 to a retracted position within cylinder 84. However, by the admission of air under pressure to cylinder 84, piston 86 is extended to dispose trap 76 adjacent the top run of the endless belt of runout conveyor 12 as illustrated in FIG. 3.

The cam followers 46 and 60 then enter the dwell or low portion of cams A and F, respectively, opening switches 48 and 62, respectively, to deenergize motor 64 and open solenoid valve 50. Spring 58 and cylinder 46 overcomes the air pressure in cylinder 54 and retracts piston 56 and gate 58. The air is exhausted from cylinder 54 through a second line 90 in valve 50.

Figure 4:
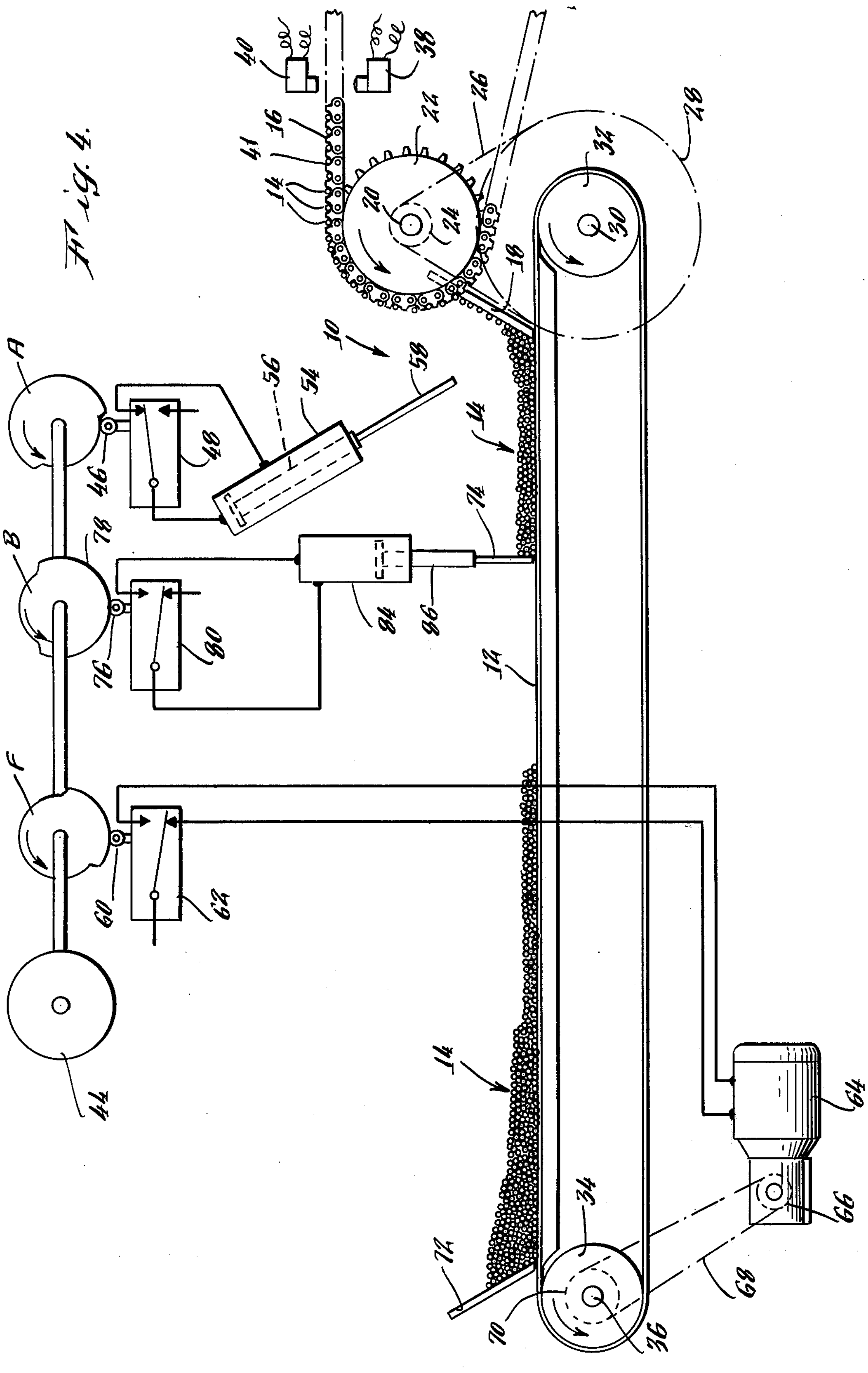
Figure 5:
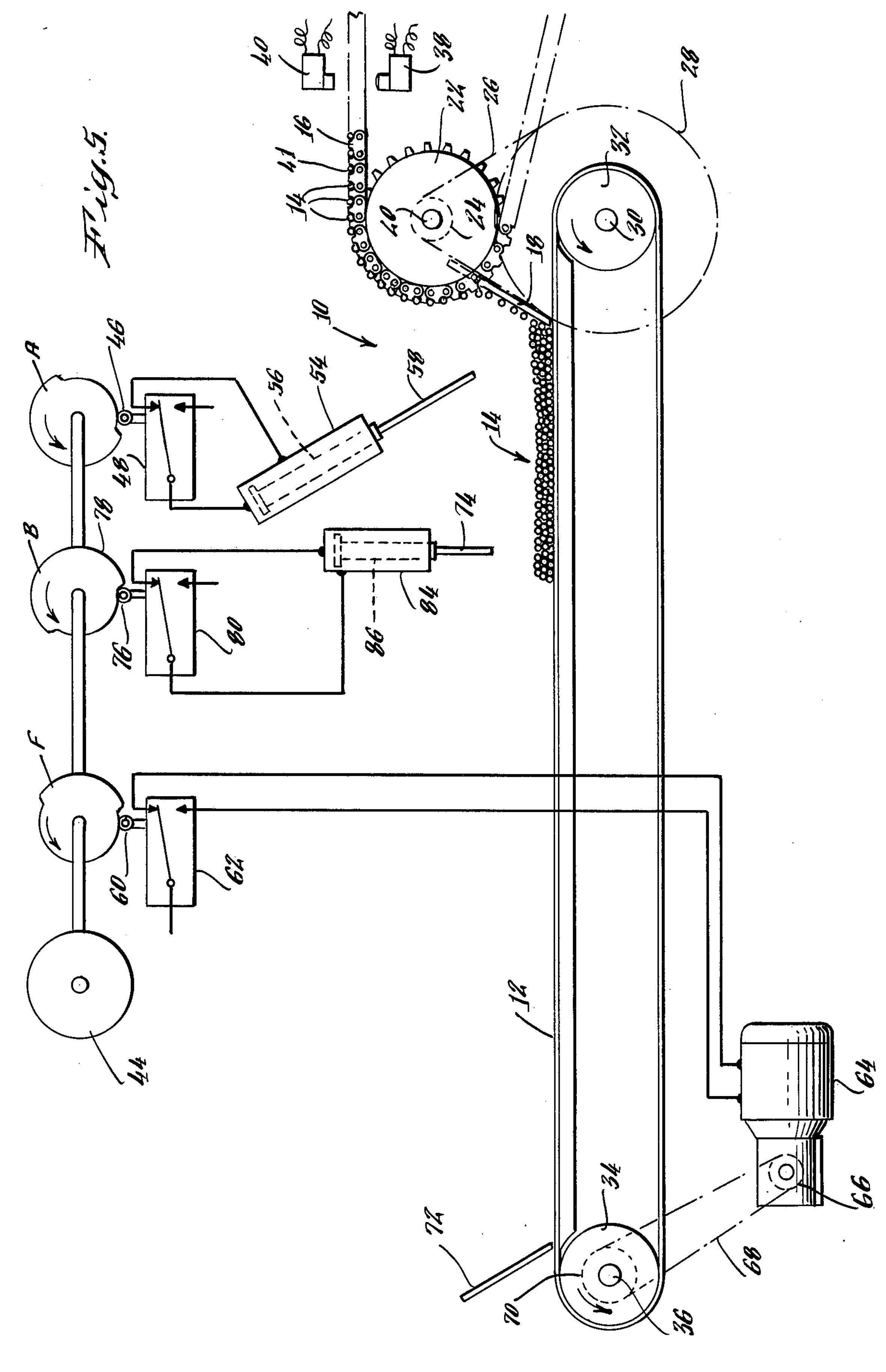

Retraction of gate 58, as illustrated in FIG. 4, permits the accumulated sticks 14 behind gate 58 to spill onto runout conveyor 12 until they contact the upstream side of trap 74. Meanwhile, runout conveyor 12 has returned to normal operating speed of approximately 10 FPM.

When cam drive motor 44 completes its single revolution and cam follower 76 is returned to the dwell portion 78 of cam B, switch 80 opens, deenergizing solenoid valve 82 enabling air within cylinder 84 to exhaust through a second line 92 under the urging of coil spring 88 which retracts piston 86 and trap 74.

The cycle is then complete and a new cycle begins after another predetermined number of the sticks 14 are counted by photocell 38.

What is claimed is:

1. Apparatus for separating articles into groups, each containing a predetermined number of the articles comprising:

endless conveyor means having
an input end, and
an output end with an upright end wall,
means for driving said conveyor means,
means for feeding a plurality of articles onto said conveyor means,
means adjacent said feed means for counting a predetermined number of articles to be fed to and disposed on said conveyor means,
gate means between said feed means and the input end of said conveyor means for preventing further articles from being fed from said feed means to said conveyor means in response to a signal from said counting means indicating that a predetermined number of articles have been counted and fed onto said conveyor means,
means connected to said drive means for increasing the speed of said drive means upon actuation of said gate means to segregate the predetermined number of articles fed onto said conveyor means from articles behind said gate means, and
trap means between said gate means and the output end of said conveyor means operable in response to a delayed signal from said counting means for preventing the segregated articles on said conveyor means between the end wall of said conveyor means and said gate means from rolling back and commingling with articles behind said gate means upon deactivation of said gate means.

2. Apparatus in accordance with claim 1 wherein said counting means includes:

a photocell,
a cyclical fixed count counter responsive to a predetermined number of pulses received from said photocell, and
single revolution motor means responsive to a signal from said counter for rotating a cam to activate said gate means and trap means in timed sequence.

3. Apparatus in accordance with claim 2 wherein:

said means for increasing the speed of said drive means includes
second motor means connected to said drive means for increasing the speed of said drive means in response to actuation of said single revolution motor means.

* * * * *